United States Patent

Brown, Jr. et al.

[11] Patent Number: 5,301,728
[45] Date of Patent: Apr. 12, 1994

[54] DUAL BEAD DIAMETER TIRE

[75] Inventors: Jack E. Brown, Jr.; Archie E. Ni, both of Akron, Ohio

[73] Assignee: The Goodyear Tire & Rubber Company, Akron, Ohio

[21] Appl. No.: 5,682

[22] Filed: Jan. 19, 1993

[51] Int. Cl.$^5$ .............. B60C 3/06; B60C 9/02; B60C 9/18

[52] U.S. Cl. .............. 152/209 R; 152/454; 152/455; 152/456; 152/526; 152/548; 152/DIG. 6; 156/110.1

[58] Field of Search .......... 152/209 R, 454–456, 152/526, 548, DIG. 6; 156/110.1, 123 A

[56] References Cited

U.S. PATENT DOCUMENTS

| | | | |
|---|---|---|---|
| 774,790 | 11/1904 | Seddon | 152/DIG. 6 X |
| 870,248 | 11/1907 | Palmer | 152/DIG. 6 X |
| 1,157,559 | 10/1915 | Lewellen | 152/DIG. 6 X |
| 2,018,597 | 10/1935 | Bourdon | 152/DIG. 6 X |
| 2,028,702 | 1/1936 | Hale | 152/DIG. 6 X |
| 2,108,329 | 2/1938 | Carter | 152/DIG. 6 X |
| 2,347,622 | 4/1944 | Tschanz | 152/DIG. 6 X |
| 2,843,171 | 7/1958 | Howe | 152/456 X |
| 3,656,532 | 4/1972 | Roberts | 152/456 X |
| 3,842,882 | 10/1974 | Gough et al. | 152/DIG. 6 X |
| 3,974,870 | 8/1976 | Watts | 152/DIG. 6 X |
| 4,124,679 | 11/1978 | DeWitt | 152/DIG. 6 X |

FOREIGN PATENT DOCUMENTS

| | | | |
|---|---|---|---|
| 598891 | 5/1934 | Fed. Rep. of Germany . | |
| 0756655 | 12/1933 | France | 152/DIG. 6 |
| 0796666 | 4/1936 | France | 152/DIG. 6 |
| 818460 | 9/1937 | France . | |
| 0849466 | 11/1939 | France | 152/DIG. 6 |
| 0362782 | 9/1938 | Italy | 152/DIG. 6 |
| 359049 | 1/1962 | Switzerland . | |

Primary Examiner—Michael W. Ball
Assistant Examiner—Adrienne C. Johnstone
Attorney, Agent, or Firm—David E. Wheeler

[57] ABSTRACT

A pneumatic tire having two different bead diameters has handling, ride and treadwear advantages. The tire is made so that the $\rho_m$ of the longer sidewall and the $\rho_m$ of the shorter sidewall are equal. The $\rho_m$ of the longer sidewall is made equal to the $\rho_m$ of the shorter sidewall by establishing a belt profile wherein the amount of drop at a belt edge is specified to give a mold drop of 0.30 to 0.33 of estimated tire deflection, applying an inflated shape prediction formula to calculate the inflated belt profile and varying the value of $\rho_m$ until the drop at the end of the belt closely matches a specified value, using the cosine law to specify the change in belt angle with radius, choosing a shoulder point under the belt edge that allows a 0.050 inch wedge between the bottom of the belt and the top of the carcass ply and varying the slope of the ply at the shoulder point until the inflated ply line passes through the Y-max location at $\rho_m$.

11 Claims, 4 Drawing Sheets

DUAL BEAD DIAMETER TIRE

BACKGROUND

The invention relates to a pneumatic tire having two different bead diameters and a method therefor.

In the early development of tires and wheels for automobiles, tires were sometimes made with different bead diameters to make easier the mounting of a tire over a cumbersome braking mechanism on the automobile. See for example U.S. Pat. Nos. 774,790; 870,248; 1,157,559; 2,347,622; 2,018,597; 2,028,702; 2,108,329; 2,843,171; French Patents 756,655; 849,466; 796,666, 818,460; Italian Patent 362,782; Swiss Patent 359,049; and German Patent 598,891.

In more recent years, it has been theorized by some that a dual bead diameter tire may have particular handling, ride, and/or treadwear advantages. See for example U.S. Pat. Nos. 3,656,532; 3,842,882; 3,974,870; and 4,124,679.

Prior art dual bead diameter tires, however, because of the one long sidewall and one short sidewall, tend to be unstable in use. On inflation, for example, the tread tends to shift to one side, causing the center of the tread to be out of alignment with the center of the tire. This causes one side of the tread to bear more of the weight of the vehicle than the other side of the tread. Also, because of the tire shift on the wheel during inflation, one bead becomes more generally aligned with the maximum width of the sidewall, making more probable the slipping of the bead off the wheel during cornering or when hitting ruts or potholes.

The prior art has tried, without full success, controlling the stability of such tires by (1) making the sidewalls equal length, (2) making the sidewalls different lengths where the shorter sidewall terminates where the equilibrium shape of the sidewall becomes perpendicular to the axis of rotation of the tire, (3) making sidewalls of different lengths where the contour lengths are substantially equal, and (4) by molding the tire in an asymmetrical mold.

It is an object of the present invention to provide a dual bead diameter pneumatic tire which has all the advantages expected of a dual bead diameter tire, but substantially eliminates the problems encountered by such tires in the past. Other objects of the invention will be apparent to those skilled in the art from the following specification and claims.

DEFINITIONS

"Bead" refers to that part of the tire comprising an annular tensile member wrapped by ply cords and shaped, with or without other reinforcement elements such as flippers, chippers, apexes, toe guards and chafers, to fit the design rim.

"Belt" refers to at least two annular layers or plies of parallel cords, woven or unwoven, underlying the tread, unanchored to the bead, and having both left and right cord angles in the range from 17 degrees to 27 degrees with respect to the equatorial plane of the tire.

"Carcass" refers to the tire structure apart from the belt structure, tread, undertread and sidewall rubber over the plies, but including the beads.

"Tire Deflection" refers to the vertical displacement of an inflated tire when subjected to a load.

"Drop at the belt edge" refers to the vertical (perpendicular) distance at the belt edge from a line tangent to the center of the tread.

"Equatorial Plane (EP)" of the tire refers to a plane passing through the center of the tire tread at all locations around the circumference of the tire.

"Flex points" refers to the points in the sidewall which undergo deformation when the tire is placed under load or rotated under load.

"Tread centerline" refers to the intersection of the EP with the tread.

SUMMARY OF THE INVENTION

The invention relates to a pneumatic tire comprising a pair of annular beads of unequal diameter, at least one carcass ply is wrapped around the beads, and a tread is disposed over the carcass ply in a crown area of the tire. A longer sidewall and a shorter sidewall are disposed between the tread and the beads wherein the $rho_m$ of the longer sidewall is substantially equal to the $rho_m$ of the shorter sidewall. Because of the shape of the sidewalls, the centerline of the tread of the tire substantially corresponds with the equatorial plane of the tire, and the curvature above $rho_m$ of both sidewalls is substantially the same. In the tire, the cord length of the carcass below each sidewall is adapted to minimize stresses.

In the method of the invention for building the tire, a belt profile is established wherein the amount of drop at the belt edge is 0.20 to 0.38 of the estimated tire deflection. An inflated shape prediction formula is used to calculate the inflated belt profile, and the value of $rho_m$ is varied in the formula until the drop at the end of the belt closely matches a specified value. The cosine law is used to specify the change in belt angle with the change in trend radius caused by the drop. After optimum criteria are established, a point is chosen on the shoulder of the tire for application of a 0.050 inch wedge between the bottom of the belt and the top ply which causes a sidewall profile that approximates a ply line that causes the inflated ply line to pass through the Y-max at $rho_m$, and the slope of the ply at the shoulder point is varied until the desired relationship between Y-max and $rho_m$ is achieved. In the illustrated embodiment of the invention, the method further comprises the steps of establishing bead points to give a rim seat placement which is a distance equal to 25% to 40% of tread width from the tread center line for the larger diameter bead, and a rim seat a distance of 10% to 25% of tread width from the tread center for the smaller diameter bead.

DETAILED DESCRIPTION OF THE INVENTION

Figure 1:
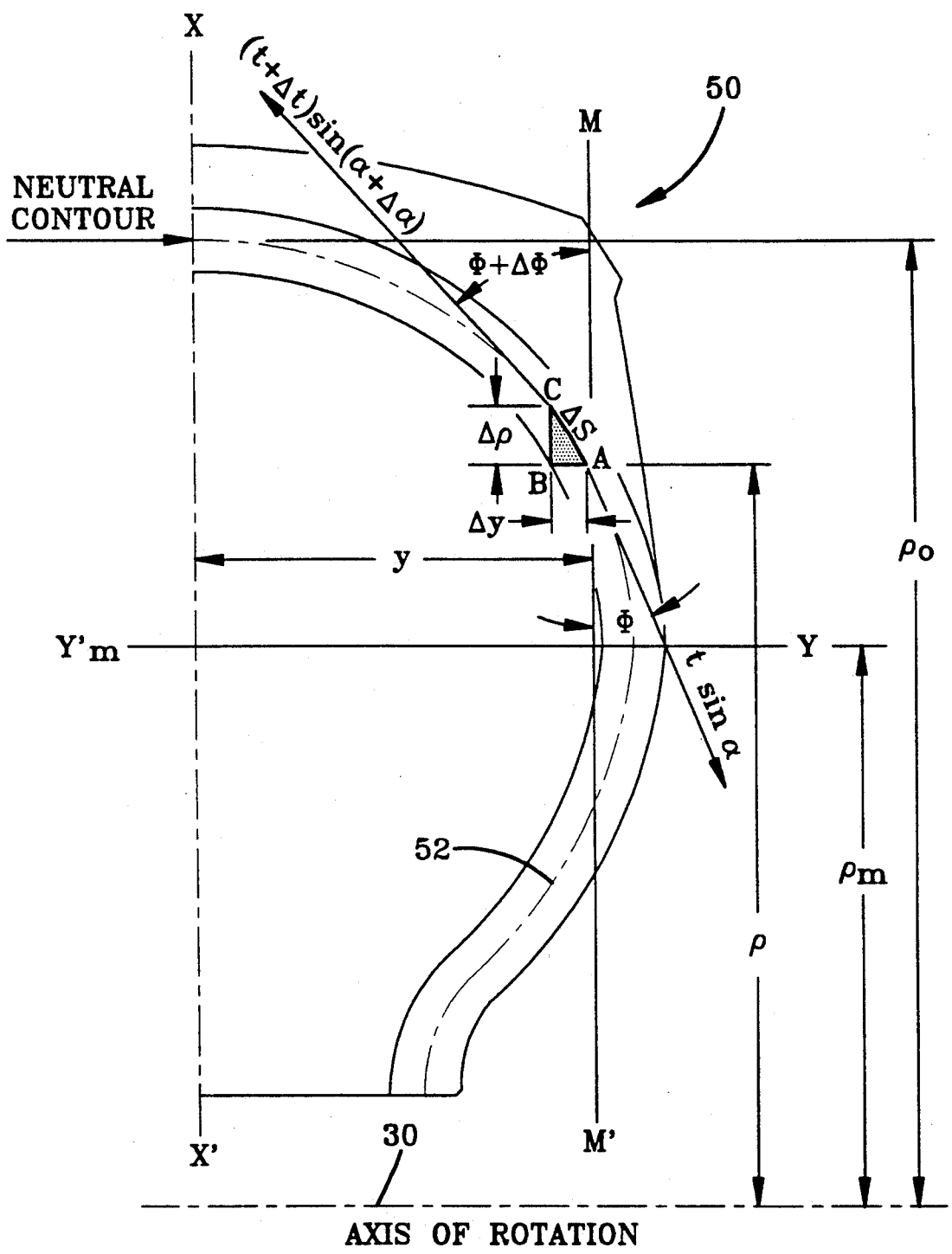
FIG. 1 illustrates a one-half cross section of a pneumatic tire illustrating Purdy dimensions.

With reference now to FIG. 1, the relevant dimensions of a tire 50, according to Purdy, "Mathematics Underlying the Design of Pneumatic Tires", Hiney Printing Co., Akron, Ohio (1963), are illustrated. Rho is the distance from the axis of rotation 30 of an inflated tire 50 to a point on the carcass ply line 52. $Rho_m$ is the perpendicular distance from the axis of rotation 30 to a line $Y_m$ which is parallel to the axis of rotation and passes through the widest (maximum) section width of the tire. The natural shape of the ply line 52 follows a strict mathematical relationship. The natural shape of the ply line can be modified by the width of the belt and the tread, by the width of the rim, the amount of turn-up around the bead (which affects the stiffness of the lower sidewall), by the use of wedges, by the length and the angle of the carcass reinforcing cords, and to some extent by the shape of the mold. Those skilled in the art will recognize that other factors provide minor contributions to the shape of the ply line.

The value of $rho_m$, in tires having beads of the same diameter, has been used as one element in an equation that is used to calculate the optimum cord angles, belt widths, cord lengths, apex size and wedge size in newly designed tires.

Until the present invention, $rho_m$ has been used as a variable in tires having beads of different diameters, i.e. the value of $rho_m$ for each side of the tire was allowed to float depending on the other dimensions in the tire.

It has been discovered in accordance with the present invention that when $rho_m$ is controlled in a dual bead diameter tire, such that the $rho_m$ of the long side of the tire is equal to the $rho_m$ of the short side of the tire, improved stability in the tire is obtained.

Figure 2:
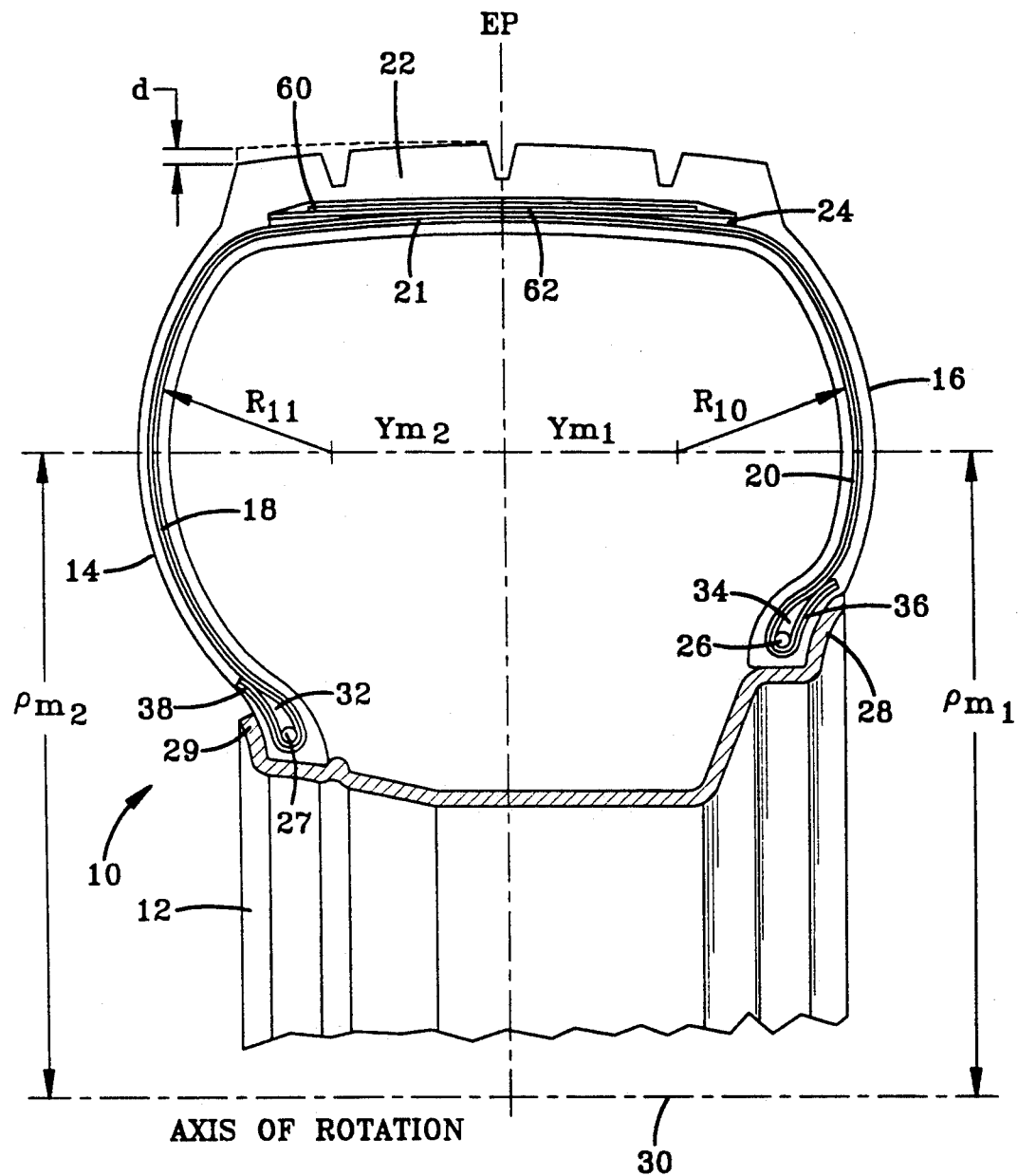
FIG. 2 illustrates a cross section of a pneumatic tire having beads of different diameters.

With reference now to FIG. 2, in dual bead diameter tire 10, bead 26 has a larger diameter than bead 27, and accordingly, sidewall 16 and ply line 20 of carcass ply 21 are shorter than sidewall 14 and ply line 18. In the illustrated embodiment, bead 27 is 15 inches and bead 26 is 17 inches.

In the embodiment of tire 10, $rho_{m1}$ and $rho_{m2}$ have been adjusted to be equal by adjusting the position of wedge 24, precisely defining the length of ply lines 18 and 20, and precisely defining the size of apexes 32 and 34 and the amount of turn-up 36 and 38 around each bead 26 and 27. By thus controlling $rho_m$, the tire built according to the method of the invention demonstrates section width symmetry in the tire ($Y_{m1} = Y_{m2}$) and the center of tread 22 coincides with the equatorial plane (EP) of the tire, and $R_{10}$ is equal to $R_{11}$ ($R_{10}$ and $R_{11}$ being the radius of carcass curvature in each sidewall above $rho_m$. The tire 10 is disposed on wheel 12 such that the distance from flange 29 (which holds the smaller diameter bead and the longer ply line of the tire) to the EP of tire 10 is 30% to 45%, preferably about 38% of the width of wheel 12. Although tire 10 is not centered on wheel 12, tread 22 is centered between the flex points of the tire (on sidewalls 14 and 16), and even pressure on the tread and even wear of the tread is facilitated.

To further control the shape of the tire, the tire is cured in a mold having a shape which corresponds to the calculated shape of a tire inflated to normal pressure. Thus, the reinforcement cords and rubber components are cured to the expected shape of the tire, eliminating or substantially reducing strain on the components when the cured tire is inflated. That is, the components do not have to stretch to reach the inflated shape of the tire because they are cured in a shape consistent with inflation.

In the illustrated embodiment, although providing equal $rho_m$s in a dual bead diameter tire closely approximates complete stability in the tire, it has been found that there is a small pressure differential in the tire footprint of the inflated tire. The problem requires fine tuning in the dimensions of the tire, for example, by increasing the turn-up on the long ply or possibly by increasing slightly the length of the ply line on the short side. It has been found that one simple way of adjusting the tire construction to compensate for the tread pressure differential is to modify the tread gauge so that the tread is thicker by the amount d on one side of the tire (over the short ply line side) than the other.

In the method of building the tire, it has been found that the optimal gauge of the tread at a given point can be determined by iterative application of the equation $$\Delta Ga = \frac{Ga}{E} \cdot (P_{av} - P_{loc})$$

where $P_{av}$ is the average pressure on the tread, $P_{loc}$ is the local pressure on the tread, E is the elastic modulus of the tread rubber, Ga is the local gauge, and $\Delta Ga$ is the change in gauge required, and where $Ga + \Delta Ga$ becomes Ga in each subsequent iterative step.

The local pressure ($P_{loc}$) and local gauge (Ga) refers to specific points on the tire tread. The tread can be described as a matrix of an infinite number of points, and the calculation described by the above equation is carried out for each of the points in the matrix. By adjusting the gauge (Ga), equal pressure can be achieved at all points in the tread.

The tire is otherwise built as is conventional in the art.

Figure 3:
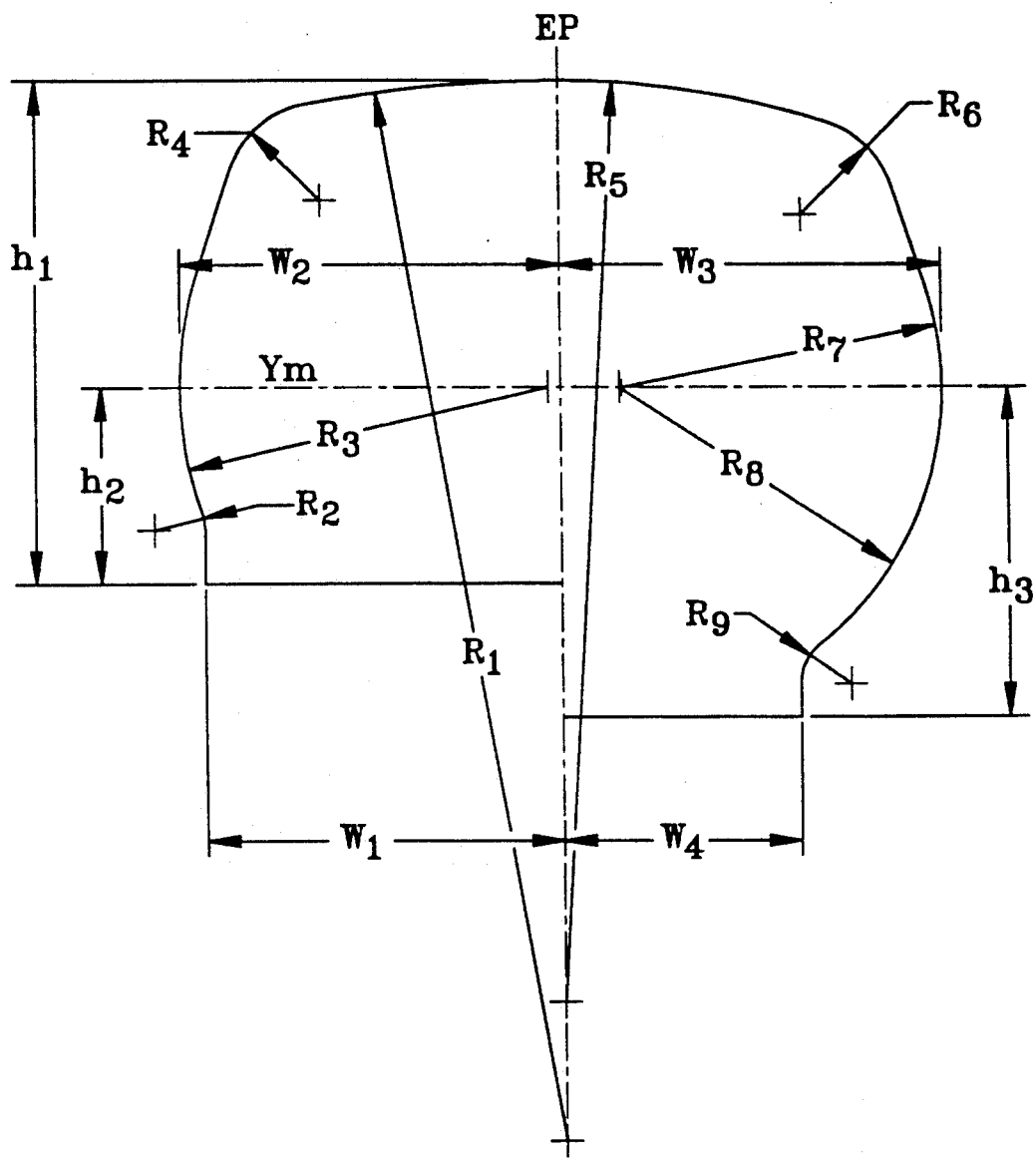
FIG. 3 illustrates specific radii which can be used in a tire of the invention.

Those skilled in the art will recognize that the change in the radius in a tread is continuous, but for convenience in measurement, the radius is measured at several points on the tire, from the center of the tread to the shoulder, in order to quantify the change. In a tire of the illustrated embodiment, each half of the tire was made with a different single radius, as illustrated in FIG. 3. The first radius, in the short sidewall half of the tire is 11.732 inches, and a second radius, in the long sidewall side of the tire is 7.643 inches, and the radius at the shoulders is 0.800 inch.

In the illustrated embodiment of FIG. 2, there are two belts 60,62 between the carcass and the tread, each belt having equal and opposite cord angles with respect to the other. In the illustrated embodiment, the cord angles of the two belts are $+23°$ and $-23°$.

Figure 4:
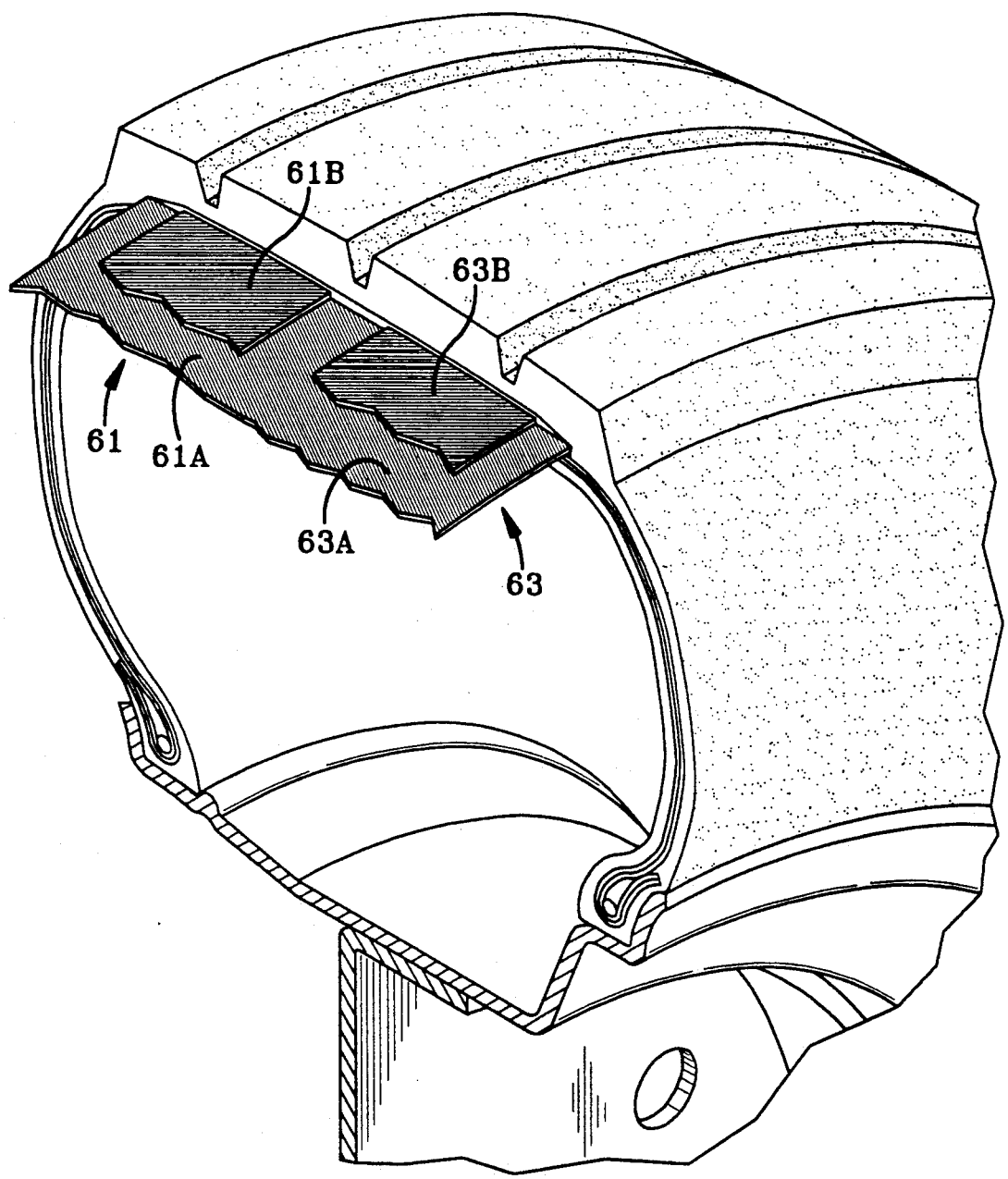
FIG. 4 illustrates varied cord angles in an alternative belt construction which can be used in the invention.

In an alternative embodiment, as illustrated in FIG. 4, and in order to compensate somewhat for the difference in the plyline shapes of the two sidewalls of the tire, two belts between the carcass and the tread can be divided into a first portion 61 on a first side of the equatorial plane of the tire, and a second portion 63 on a second side of the tire. The first portion has two belts (61a,61b) having equal and opposite cord angles (about plus and minus 23°), and the second portion has two belts (63a,63b), one with $+23°$ and one with $-20°$.

Specifically, the method of the invention comprises the steps of establishing a belt profile wherein the amount at a belt edge is specified at 0.20 to 0.38, preferably 0.30 to 0.33 of estimated tire deflection, choosing a specified value in inches for the drop at the end of the belt width (0.390 inch in the illustrated embodiment), applying the inflated shape prediction formula to calculate the inflated belt profile, and varying the value of $rho_m$ until the drop at the end of the belt closely matches a specified value, using the cosine law to specify a change in belt angle with tread radius, choosing a shoulder point under the belt edge that allows a 0.050 inch wedge gauge between the bottom of the belt and the top of the carcass ply, and varying the slope of the ply at the shoulder point until the inflated ply line passes through the Y-max location at $rho_m$ (i.e. y-max coincides with $rho_m$).

The inflated shape prediction formula used is basically described by the "Biderman formula" wherein, through various modifications apparent to those skilled in the art, tension, elastic modulus, end counts of the reinforcing cords, cord angles and the number of plies used (more than two in the instant invention) can be varied in the design of a tire. See Biderman, V. L., et al., "Automotive Tires, Construction, Design, Testing, and Operation," NASA TT F-12, 382 (Sept., 1969), Accession Number N70-16410, pages 61-63. In the present invention, as discussed above, rho is used as a constant in the formula to establish the other variables in the tire.

The "cosine law" as it relates to cord angles in a tire, and its use, is described by Purdy, ibid at pages 27, 30, and 46. The use of the cosine law in building tires is illustrated in U.S. Pat. Nos. 4,520,856; 4,481,994; and 4,076,066. As described by Purdy, the belt angles (angles of the reinforcing cords in the belt) have an influence on the ultimate shape of a tire. Accordingly, the shape of the tire can be controlled by varying the belt angles with reference to the above formulas.

In the method of the invention, bead points are established on the tire to provide a rim seat distance of 25% to 40% of tread width from the tread center line for the larger diameter bead, and 10% to 25% of the tread width from the tread center for the smaller diameter bead.

In the illustrated embodiment, the method further comprises the step of establishing bead points to give a rim seat 2.5 to 4 inches from the tread centerline for a larger diameter bead, and 1 to 2.5 inches from the tread centerline for a smaller diameter bead. As can be calculated, the tread width in the illustrated embodiment is 10 inches. In the illustrated tire, the sidewall gauge at $rho_m$ is 0.080 inch. With reference now to FIG. 3, in a specific illustrated embodiment of a tire of the invention, the tire has the height of $h_1$ of 4.161 inches from the larger diameter bead to the crown of the tire, and a height $h_2$ of 1.630 from the same bead to the maximum section width $Y_m$ of the tire. The tire has a height $h_3$ of 2.740 inches from the smaller diameter bead to $Y_m$. The tire has a distance $w_1$ of 3 inches from the larger diameter bead to the center plane of the tread, and a distance $w_4$ of 2 inches from the smaller diameter bead to the center of the tread. The distance from $Y_m$ to the center plane of the tread is 3.206 inches and the distance $w_3$ from the center plane of the tread to $Y_m$ on the small bead side of the tire of 3.206 inches. The tire has a radius $r_1$ from the center of the wheel to the crown of 11.732 inches, the radius $r_2$ of the carcass at the bottom of the short sidewall of 0.422 inches, the radius $r_3$ from a point tangent to the carcass at the lower sidewall to a point intersecting the $Y_m$ line of 3.103 inches, and the radius $r_4$ of the carcass in the shoulder area of 0.80 inches. The tire has a radius $r_5$ of 7.643 inches, the radius $r_7$ of 2.687 inches, a radius of $r_8$ of 2.707 inches and a radius $r_9$ of 0.422 inches. All radiuses comprise a line perpendicular to a tangent line at a particular point in the crown or carcass of the tire, and the length of the line is determined by the center of the circle that forms an arc at the particular point in a tire.

While the invention has been specifically illustrated and described, those skilled in the art will recognize that the invention may be variously modified and practiced without departing from the spirit of the invention. The invention is limited only by the scope of the following claims.

What is claimed is:

1. A pneumatic tire comprising a pair of annular beads of unequal diameter, at least one carcass ply wrapped around said beads, a tread disposed over said at least one carcass ply in a crown area of said tire, and a longer sidewall and a shorter sidewall disposed between said tread and said beads, the sidewall being said tread and the larger diameter bead being said shorter sidewall, wherein the $rho_m$ of the longer sidewall is substantially equal to the $rho_m$ of the shorter sidewall when said tire is inflated to its normal pressure, and wherein $rho_m$ is the perpendicular distance from the axis of rotation of a tire to a line $Y_m$ which is parallel to the axis of rotation and passes through the widest section width of the tire.

2. The tire of claim 1 in which a tread centerline coincides substantially with the equatorial plane of said tire.

3. The tire of claim 1 in which the radius of curvature above $rho_m$ of the shorter sidewall is equal to the radius of curvature above $rho_m$ of the longer sidewall.

4. The tire of claim 1 in which the gauge of said tread is varied across the tread such that when said tire is inflated to its normal pressure, and at normal load, equal pressure is applied at all points of the tread.

5. The tire of claim 1 in which said sidewalls are molded to a shape having substantially equal $rho_m$s.

6. The tire of claim 1 in which the cords of the carcass below each sidewall are molded to a shape which is the same as the shape of the cords of the carcass below each sidewall when the completed tire is inflated to its normal pressure.

7. The tire of claim 4 in which said tread is thicker on a side of the tire coinciding with the smaller diameter bead.

8. The tire of claim 7 in which tread gauge is determined at each point on the tread profile by interactive application of the equation $$\Delta Ga = \frac{Ga}{E} \cdot (P_{av} - P_{loc})$$

where $P_{av}$ is the average pressure on the tread of a tire inflated to normal pressure at normal load, $P_{loc}$ is the local pressure on the tread, E is the elastic modulus of the tread rubber, Ga is the local gauge, and $\Delta Ga$ is the change in gauge required, and where $Ga + \Delta Ga$ becomes Ga in each subsequent iterative step, whereby the tread gauge for a particular point in the tire tread is defined as the local gauge when the change in gauge required equals zero.

9. The tire of claim 7 in which said tread has at least three different radii.

10. The tire of claim 1 in which the sidewall gauge at $rho_m$ is 0.080 inch.

11. The tire of claim 1 which further comprises two belts between the carcass and the tread, said belts being divided into portion one on a first side of the equatorial plane of the tire and portion two on a second side of the equatorial plane, wherein portion one comprises two belts having equal and opposite angles, and portion two comprises two belts having unequal and opposite angles.

* * * * *